(12) United States Patent
Czaplicki et al.

(10) Patent No.: US 6,890,964 B2
(45) Date of Patent: May 10, 2005

(54) HOMOPOLYMERIZED EPOXY-BASED FORM-IN-PLACE MATERIAL

(75) Inventors: Michael J. Czaplicki, Rochester, MI (US); David J. Kosal, Richmond, MI (US); Keith Madaus, Goodwells, MI (US)

(73) Assignee: L&L Products, Inc., Romeo, MI (US)

( * ) Notice: Subject to any disclaimer, the term of this patent is extended or adjusted under 35 U.S.C. 154(b) by 277 days.

(21) Appl. No.: 10/119,446

(22) Filed: Apr. 10, 2002

(65) Prior Publication Data

US 2003/0060522 A1 Mar. 27, 2003

Related U.S. Application Data

(60) Provisional application No. 60/324,486, filed on Sep. 24, 2001.

(51) Int. Cl.$^7$ .................. C08J 9/00; C08J 9/02
(52) U.S. Cl. .................. 521/54; 521/97; 521/135; 521/178
(58) Field of Search .................. 521/135, 178, 521/54

(56) References Cited

U.S. PATENT DOCUMENTS

| | | |
|---|---|---|
| 4,427,481 A | 1/1984 | Smith et al. |
| 4,538,380 A | 9/1985 | Colliander |
| 4,693,775 A | 9/1987 | Harrison et al. |
| 4,724,243 A | 2/1988 | Harrison |
| 4,749,434 A | 6/1988 | Harrison |
| 4,769,166 A | 9/1988 | Harrison |
| 4,922,596 A | 5/1990 | Wycech |
| 4,923,902 A | 5/1990 | Wycech |
| 4,978,562 A | 12/1990 | Wycech |
| 5,124,186 A | 6/1992 | Wycech |
| 5,648,401 A | 7/1997 | Czaplicki |
| 5,712,317 A | 1/1998 | Makhlouf et al. |
| 5,884,960 A | 3/1999 | Wycech |
| 5,932,680 A | 8/1999 | Heider |
| 5,948,508 A | 9/1999 | Pastore et al. |
| 5,964,979 A | 10/1999 | George et al. |
| 5,985,435 A | 11/1999 | Czaplicki et al. |
| 5,994,422 A | 11/1999 | Born et al. |
| 6,004,425 A | 12/1999 | Born et al. |
| 6,030,701 A | 2/2000 | Johnson et al. |
| 6,040,350 A | 3/2000 | Fukui |
| 6,057,382 A | 5/2000 | Karim et al. |
| 6,077,884 A | 6/2000 | Hess et al. |
| 6,096,791 A | 8/2000 | Born et al. |
| 6,136,398 A | 10/2000 | Willett et al. |
| 6,153,302 A | 11/2000 | Karim et al. |
| 6,174,932 B1 | 1/2001 | Pachl et al. |
| 6,218,442 B1 | 4/2001 | Hilborn et al. |
| 6,228,449 B1 | 5/2001 | Meyer |
| 6,263,635 B1 | 7/2001 | Czaplicki |
| 6,277,898 B1 | 8/2001 | Pachl et al. |
| 6,312,668 B2 | 11/2001 | Mitra et al. |
| 6,348,513 B1 | 2/2002 | Hilborn et al. |
| 6,350,791 B1 | 2/2002 | Feichtmeier et al. |
| 6,376,564 B1 | 4/2002 | Harrison |
| 6,444,713 B1 * | 9/2002 | Pachl et al. |

FOREIGN PATENT DOCUMENTS

| | | |
|---|---|---|
| WO | WO 99/02578 | 1/1999 |
| WO | WO 01/57130 | 8/2001 |

OTHER PUBLICATIONS

"The Epoxy Book", A System Three Resins Publication, pp. 1–41, System Three Resins, Inc., Seattle, Washington.
"Epoxy Resins", Second Edition Encyclopedia of Polymer Science and Engineering, vol. 6, pp. 322–382, 1985.
Copending U.S. Appl. No. 09/939,245 filed Aug. 24, 2001.
Copending U.S. Appl. No. 09/847,252 filed May 2, 2001.
Copending U.S. Appl. No. 09/858,939 filed May 16, 2001 (formerly U.S. Appl. No. 60/225,126).
Copending U.S. Appl. No. 09/502,686 filed Feb. 11, 2000.
Copending U.S. Appl. No. 09/459,756 filed Dec. 10, 1999.
Copending U.S. Appl. No. 09/676,335 filed Sep. 29, 2000.
Copending U.S. Appl. No. 09/676,443 filed Sep. 29, 2000.
Copending U.S. Appl. No. 09/676,725 filed Sep. 29, 2000.
Copending U.S. Appl. No. 09/524,961 filed Mar. 14, 2000.
Copending U.S. Appl. No. 09/923,138 filed Aug. 6, 2001.
Copending U.S. Appl. No. 60/324,495 filed Sep. 24, 2001.

* cited by examiner

Primary Examiner—Morton Foelak
(74) Attorney, Agent, or Firm—Dobrusin & Thennisch PC

(57) ABSTRACT

A two-component foam-in-place structural material for producing a foamed product. The first component of the system includes an epoxy-based resin preferably formulated with a physical blowing agent particulate material. The physical blowing agent core is encapsulated within a shell or skin that will change state. The second component is an acid that is capable of initiating polymerization of the resin. A reactive mixture is achieved through the combination of the first and second components wherein heat from the exothermic reaction of the epoxy component caused by the acid in turn causes the thermoplastic shell having a solvent core to soften and increase in size due to gas pressure and change in state of the shell thereby foaming the reactive mixture.

14 Claims, No Drawings

HOMOPOLYMERIZED EPOXY-BASED FORM-IN-PLACE MATERIAL

The present application claims the benefit of the filing date of U.S. Provisional Application Ser. No. 60/324,486, filed Sep. 24, 2001, hereby incorporated by reference.

FIELD OF THE INVENTION

The present invention relates generally to foam-in-place materials used for filing and/or reinforcement of hollow cavities. More particularly, the present invention relates to formulations and methods of making foamed synthetic polymers, which exhibit high stiffness, good adhesion to metallic substrate and resistance to high humidity or corrosive environments.

BACKGROUND OF THE INVENTION

Traditional foam-in-place structural materials known in the art generally disclose polyurethane, polyurea materials or epoxy-based materials with or without a blowing agent. These materials are typically composed of a mixture of ingredients to enable expansion and curing to occur at rates that enable development of a cured cellular product. For example, commonly assigned U.S. Pat. No. 5,648,401 for Foamed Articles And Methods Of Making Same, which is hereby expressly incorporated by reference, teaches a three-ingredient foam-in-place structural material. Although these prior art materials are both useful and successful in a number of applications for purposes that include acoustics and sealing, certain applications in the automotive, construction, aerospace, and other industries would benefit from a material having a rapid curing foam-in-place material with the ability to be tailored to fit various applications without using toxologically undesirable materials such as isocyanate functional chemicals, or liquid amines.

As known by those skilled in the art, a number of factors determine the suitability of a process for forming a foamed product of the type in which a blowing agent forms cells in a synthetic resin as the resin is cured. Most significantly, the interaction of the rate of cure and the rate at which the blowing gas is generated must be such that the correct foam volume is attained. If the resin cures too rapidly there is inadequate time for the gas to form the proper size and number of gas voids in the finished product. Over expansion of the forming foam product must also be avoided. Rapid expansion due to a slow cure rate may cause the expanding foam to simply collapse as a result of inadequate wall strength surrounding the individual gas cells.

Generally speaking, foamed products must have good stability when exposed to various environmental conditions and, most significantly, in many applications they must protect metal from corrosion when exposed to hostile environmental conditions. This is particularly true in automotive applications where the foamed product can be utilized and placed within portions of the vehicle that are routinely exposed to hostile environmental conditions, ambient temperature and weather fluctuations, as well as structural stress and strain.

In the past, many foamed parts were made using polyurethane which provides a number of desirable attributes. It is known, however, that alternatives to urethane-based or urea-based foams are frequently more environmentally desirable. Such environmental concerns relate to material handling during manufacturing as well as waste management concerns, in part due to unreacted functional groups in the finished products and difficulty in handling isocyanate functional chemicals in manufacturing processes.

Accordingly, there is a need in industry and manufacturing operations for a foam-in-place material, particularly one that may be structural with corresponding mechanical properties but without the negative attributes based on foams created using isocyanate chemistry. The present invention addresses and overcomes the shortcomings found in the prior art by providing a first epoxy component formulated with a thermoplastic shell that encapsulates a physical blowing agent. A second component consisting of an acid, and preferably a strong acid is then combined with the first epoxy component to produce a reactive mixture foam-in-place material which when cured demonstrates good adhesion to metallic substrates and good resistance to high humidity or corrosive environments when compared to foam-in-place materials known in the art.

SUMMARY OF THE INVENTION

The present invention relates to methods, materials, and products for foam-in-place structural reinforcement of automotive vehicles. Commonly assigned U.S. Pat. No. 5,648,401 discloses a composition which cures and foams at room temperature which contains an acid-catalyzed, polymerizable resin, an acid and a filler which liberates gas in a reaction with the acid. In U.S. Pat. No. 5,648,401, the acid serves the dual purpose of catalyzing the polymerization reaction and generating the foaming gas. Although this composition is both useful and desirable in many applications, the present invention further utilizes a blowing agent, such as EXPANCEL more fully described herein. The use of EXPANCEL as a blowing agent in the present invention decouples the curing and expansion mechanisms to allow greater flexibility and more targeted uses in the choice of epoxy resins, reaction rate(s), and corresponding reaction exotherm. In addition, since the blowing agent of the present invention is integrated within the reaction for curing, a diluted or less acidic material can be used for curing. This added flexibility of the formulation of the present invention provides a wide latitude in material choices, handling requirements, and targeted applications of the cured material which can include structural, sealing, NVH, and/or acoustical applications.

In one embodiment, the present invention comprises a two-component foam-in-place structural material for producing a foamed product. Though other resin systems are possible, the first component of the system includes an epoxy-based resin. Preferably, the first component is formulated with a physical blowing agent particulate material. More preferably, physical blowing agent core is encapsulated within a shell or skin that will change state. For example, the shell may be a wax or a thermoplastic that, upon heating, will soften to enable the solvent core to expand the thermoplastic shell. It is contemplated that the shell having a solvent core may further comprise a blowing agent formulated with the epoxy resin, used together as a first component. The second component is an acid that is capable of initiating polymerization of the resin. A reactive mixture is achieved through the combination of the first and second components wherein heat from the exothermic reaction of the epoxy component caused by the acid in turn causes the thermoplastic shell having a solvent core to soften and increase in size due to gas pressure and change in state of the shell thereby foaming the reactive mixture. The introduction of the acid with the solvent-filled polymer particles causes the shell to soften and permit expansion from the gas pressure produced by the solvent contained within the polymer particle. The resulting temperature that will initiate foaming in the reactive mixture during the particle expansion is somewhat dependent on the type of particle used to create the initial polymer particle found in the epoxy as well as the type of solvent that is encapsulated within the thermoplastic shell. As the homopolymerization exothermic reaction continues, the now gas filled polymer particles continue to expand and create a foam-in-place material as the epoxy component cures.

The present invention provides a method of forming a foamed product which comprises the steps of combining the first component (with a physical blowing agent core) with the second or acid component that induces homopolymerization and corresponding generation of reaction exotherm. The first component, preferably an epoxy, is cross-linked through a polymerization reaction catalyzed by the second component (e.g. the acid). In this regard, an exothermic reaction or reactive mixture is created between the epoxy component and the acid component when combined. The heat generated by the exothermic reaction softens the thermoplastic shell or skin encapsulating the solvent core thereby enabling the solvent core to expand the thermoplastic shell from the heat generated by the exothermic or reactive mixture. As the thermoplastic shell with the solvent core softens from the heat, expansion occurs as a result of increased gas volume. In a preferred embodiment the mixture of materials is in liquid form. However, it is contemplated that the mixture of materials could also comprise a paste or solids of varying viscosities and textures.

DETAILED DESCRIPTION OF THE INVENTION

As used herein, all concentrations shall be expressed as percentages by weight unless otherwise specified. As used herein, the term "epoxy resin" shall be defined as a thermosetting resin based on the reactivity of the epoxide group. As used herein "polymerization" shall be defined as the polymerization of monomers or prepolymers. As used herein "phosphoric acid" shall include not only phosphoric acid but also esters of phosphoric acid and other derivatives which can produce the acid catalyzed polymerization as described herein.

The present invention relates generally to a two component foam-in-place material and method for making the same formed by cross-linking reactions between an epoxy resin and an acid-based curing agent that creates a three-dimensional covalent bond network. It is contemplated that the addition of the acid-based curing agent to the epoxy resin causes the resin to undergo homopolymerization or otherwise harden into a rigidified cross-linked polymer. Cure of the foam is achieved by a homopolymerization reaction of the epoxy resin catalyzed by the acid-based curing agent, which is typically an exothermic reaction and can generate considerable heat. The control of such heat and the exothermic reaction is an important consideration of the foam-in-place material of the present invention. Since the foam-in-place material of the present invention is particularly useful in the production of automobiles and other vehicles to maintain and/or increase the strength of structural members such as frame members, rails, rockers, pillars, radiator support beams, doors, hatches, reinforcing beams and the like, exothermic control prevents the charring or burning of the interior of the foam and articles in contact with the member being reinforced or filled.

More particularly, the method and composition of the present invention has two main components: (1) a resin, preferably a liquid resin having an average reactive functionality of at least two, and (2) an acid component that is capable of initiating polymerization of the resin. The first or resin component is further defined as having a solvent core encapsulated by a polymer or formulated within a thermoplastic shell or skin. Although the solvent core within the thermoplastic shell may further comprise a blowing agent formulated with the resin component, no additional curing agent or blowing agent is expressly required in the present invention. In this regard, it is contemplated that the acid component, when combined with the resin component (having the encapsulated solvent core), initiates the curing process and expansion via the curing process reaction exotherm. Still further, a thixotropic additive may be formulated in one or both of the first and second components, which produces shear-thinning characteristics useful for processing and generation of a foamed product. Moreover, the exothermic reaction generated by the combination or mixture of the first and second components serves to soften the thermoplastic shell that encapsulates the solvent core. As the thermoplastic shell softens, the solvent expands the shell to create a foaming process. The preferred solvent and shell is selected for its expansion properties when exposed to the heat of the exothermic reaction, which occurs during polymerization.

In a particularly preferred embodiment, the components or formulation of the present invention consist of the following:

First or Resin Component

The first or resin component of the present invention is selected for its structurally adhering characteristics and the ability of the chemical functional groups to be homopolymerized through acid catalysis. Suitable resins may include a cross-linking polymer and, more preferably an epoxy. The properties of advantageous epoxy resins are described, for example, in the chapter entitled "Epoxy Resins" in the Second Edition of the Encyclopedia of Polymer Science and Engineering, Volume 6, pp. 322–382 (1986). The preferred epoxy resin has a number average molecular weight of from about 350 to about 600 and, on average the epoxy resin or mixture of epoxy resins has from about 1.8 to about 2.5 epoxide functional groups per molecule. The preferred epoxy resin has a viscosity of from about 5,000 to 100,000 cps (Brookfield viscosity) at 70° F. and a specific gravity of from about 1.0 to about 1.4. As stated, the preferred form of the resin is a liquid and may further comprise a high viscosity resin with relatively low reactivity which in part may be used to control the reaction exotherm. Exemplary epoxy resins which could be utilized in the present invention include polyglycidyl ethers obtained by reacting polyhydric phenols such as bisphenol A, bisphenol F, bisphenol AD, catechol, resorcinol, or polyhydric alcohols such as glycerin and polyethylene glycol with haloepoxides such as epichlorohydrin; glycidylether esters obtained by reacting hydroxycarboxylic acids such as p-hydroxybenzoic acid or beta-hydroxy naphthoic acid with epichlorohydrin or the like; polyglycidyl esters obtained by reacting polycarboxylic acids such as phthalic acid, tetrahydrophthalic acid or terephthalic acid with epichlorohydrin or the like; epoxidated phenolic-novolac resins (sometimes also referred to as polyglycidyl ethers of phenolic novolac compounds); epoxidated polyolefins; glycidylated aminoalcohol compounds and aminophenol compounds, hydantoin diepoxides and urethane-modified epoxy resins. Mixtures of epoxy resins may also be used in the present invention. For example, mixtures of liquid (at room temperature), semi-solid, and/or solid epoxy resins can be employed, particularly solvated solid epoxy resins.

In a preferred embodiment, the resin of the present invention is an epoxy resin, most preferably an epoxy resin sold under the name Cardolite NC-514 by the Cardolite Company of Newark, N.J. and/or DER 331 sold by the Dow Chemical Company of Midland, Mich. Other commercially available resins, which may be suitable in the present application, include DER 317, DER 337, DER 732, DER 736 and DER 324, all of which are sold by Dow Chemical Company of Midland, Mich. The preferred epoxy resin has a number average molecular weight of from about 350 to about 600 and, on average the epoxy resin or epoxy resin mixture has from about 1.8 to about 2.5 epoxide functional groups per molecule. The preferred epoxy resin has a viscosity of from about 10,000 to 100,000 cps (Brookfield viscosity) at 70° F. and a specific gravity of from about 1.0 to about 1.4. A resin or resin mixture forms from about 35 to about 95% by weight and more preferably from about 50 to about 98% by weight of the composition of the present invention.

As stated above, it is contemplated that the first or resin component of the present invention is formulated with a thermoplastic shell with a solvent core. The solvent core of the present invention may consist of 1-butene or other commercially available liquid physical blowing agents. More particularly, the solvent core used in the present invention may comprise microspheres in the form of a polymer shell encapsulating a gas such as that sold under the EXPANCEL® line of products available through Akzo Nobel. Particularly preferred results were found when the present invention utilized Expancel DU, and more particularly Expancel 820DU. The EXPANCEL® product provides a liquid hydrocarbon encapsulated by a gasproof, polymeric shell. When exposed to heat, the polymeric shell will soften and the hydrocarbon will gasify causing the microsphere to expand. Before exposure to heat and expansion, the typical diameter of a microsphere is about 10–12 μm and the density is around 1000–1200 kg/m3. As the polymeric shell softens and the hydrocarbon gasifies during expansion, the typical diameter of the microspheres increases to around 40–50 μm and the density drops to 30–40 kg/m3. Most notably, when the gas inside the shell is heated, it increases its pressure and the thermoplastic shell softens, resulting in an increase in the volume of the microspheres. Expansion of the microspheres is utilized in the formulation of the present invention to reduce density, improve sound insulation, and in some applications may be used to improve adhesion and reduce moisture transport. Alternatively, chemical blowing agents such as those available through Uniroyal under the designation Celogen, such as Celogen OT or Celogen AZ may be used. The thermoplastic encapsulated solvent typically serves as the blowing agent to produce expansion. Because epoxies normally react with a curing agent without evolving volatiles the addition of a blowing agent is beneficial in creation of a foamed product. A combination of two or more blowing agents may be incorporated as well. Examples include, a chemical agent, (i.e. one that thermally decomposes and evolves gas due to the heat of the exothermic epoxy reaction), and a physical agent, which simply vaporizes at its boiling temperature to liberate gas used in combination. In the event that a chemical blowing agent is used, particle size of the blowing agent may be adjusted so as to provide the desired foaming characteristics while the foam is curing. For example, smaller particle sizes tend to provide foams having more uniform cell structure. In some alternative formulations of the present invention, it may be desirable to also use a blowing agent activator or accelerator so as to lower the temperature at which release of gas from the blowing agent takes place. Suitable blowing agent activators include, but are not limited to, ureas (such as the surface-coated, oil-treated urea sold by Uniroyal Chemicals under the trademark BIKOT) polyols, organic acids, amines, and lead, zinc, tin, calcium and cadmium oxides and salts (including carboxylic acid salts).

Typically, from about 0.1% to about 2% of a blowing agent based on the weight of the foamable composition is employed, although the optimum amount will of course vary depending upon the curing agent selected, the amount of blowing agent, ambient conditions- cure and other variables. An example of a preferred physical blowing agent (solvent core/thermoplastic shell), which according to the present invention is formulated with the first or resin component, is sold under the trade name Expancel 820-DU. Most preferably, the solvent is hydrocarbon core of the blowing agent of the present invention is a liquid prior to exansion.

Second or Acid Component

The second component of the present invention is an acid, which initiates the curing reaction or process. Advantageously, by using an acid, a system or composition may be formed that reacts relatively quickly. It is contemplated, however, that compositions or systems according to the present invention may have reaction times varying over a wide range. Exemplary reaction time may range from about a few seconds to about an hour or more.

The strength or concentration of the acid component is a contributing factor in calculating and controlling the latent period of the reactive mixture, hereinafter defined as the period before significant exothermic reaction and hence foaming. The latent period of the present invention can be very short, such as a few seconds, or up to thirty minutes or longer depending upon the strength of the acid, percentage of acid, and a combination thereof or other art recognized variables. For example, the latent period can be affected and controlled by the type and molecular weight of the epoxy or epoxy resins chosen. All of these factors can influence the timing, characteristics, and foaming of the reactive mixture. Although a number of acids in varying molarity may be suitable for use in the present invention, a simple method to control acid is by dilution with water which is well known in the art. Generally speaking, strong acids are not used to cure epoxide functional materials since the relatively rapid exothermic reaction or reactive mixture causes the curing polymer to char and/or develop poor physical properties. The present invention reduces, and substantially prevents charring since heat is dissipated (i.e. less heat per volume) due to the foaming process. More specifically, heat build-up is reduced through the reaction of the acid with the resin component to generate gas in the blowing reaction and diffuse heat from the exothermic curing reaction such that heat is dissipated more efficiently by the polymerizing resin. In the embodiment discussed above wherein the core comprises a polymer encapsulated solvent, the acid initiated hompolymerization of the epoxy component or epoxide functional material softens or melts the encapsulated coating. The softening of the shell surrounding the physical blowing agent can be further controlled and directed through the use of particle having: a varying melting point shell, a varying coating thickness shell varying size of particles, and a varying percentage of acid and type of acid used in the formulation, all of which can affect the timing, characteristics, and foaming of the reactive mixture.

The preferred acid in the present invention is one which is capable of reacting with the resin component to promote a polymerization reaction that results in a controlled curing of the resin. In this regard, phosphoric acid (orthophosphoric acid; H3PO4) is most preferred. Most preferably, the acid component of the composition of the present invention is a liquid, but may be found in other forms. The strength of the acid in Molarity is preferably from about 7 to about 14.7M and more preferably from about 10 to about 14.7M. Although water can be used to dilute and control acid strength for purposes of controlling the latent period, it is desirable in some applications to minimize the quantity of water present in the acid component since water may decrease the reaction rate. Accordingly, it is preferred that relatively concentrated acids be used in the present invention if rapid reactions necessary. The quantity of phosphoric acid in the acid component of the present invention is preferably from about 1 to about 25% by weight and more preferably from about 5 to about 15% by weight. Since the acid component may not become part of the polymer network once cured, it is desirable to minimize the amount of acid used to the extent possible. In addition, although not required in the present invention, it is contemplated that the acid component of the present invention may also comprise and be mixed with an inert material such as carbon black powder or a thixotropic material such as an aramid pulp which may improve shear-thinning characteristics. Another inert material which may be used in the present invention is ceramic microspheres having a size range of from about 25 to 500 microns. This embodiment, with the acid component premixed to form a paste, may be preferable in some materials handling environments.

Additive(s)

Further, the present invention contemplates the formulation of additional additive component(s), which will cause both the first and second components to be shear thinning to enhance processing attributes of the material, and/or improved cured physical properties of the resultant foam material. In addition, the additives described herein may also comprise an optional third component of the formulation of the present invention. One such additive component of the present invention may include a filler. Typically, fillers are added to epoxy foam formulations to lower cost, add color, reduce exotherm, and control shrinkage rates. Fillers in the form of fine particles (for example, carbon black or fumed silica) may also serve as nucleating agents and flow control additives. Small particles provide sites for heterogeneous nucleation, which allow for initiation and subsequent growth of foam cells when certain blowing agent types are used. In heterogeneous nucleation, gas molecules driven by supersaturation preferentially form nucleation sites on the solid/fluid interfaces of the nucleating agent. The ultimate cell size is determined by other factors including the exotherm, the rate of cure, the amount of blowing agent, and interactions between the epoxy and other formulation components. Although a number of suitable additives are known in the art and discussed in commonly-assigned U.S. Pat. No. 5,648,401, incorporated by reference, a particular preferred additive of the present invention is a thixotropic additive or filler formulated within either or potentially both of the first and second components which causes both components to be shear-thinning. An example of such a thixotropic filler is an aramid pulp and is sold under the trade name Kevlar 1F543. When such an additive is used with the present invention, the thixotropic additive is formulated in at least one, and sometimes both the first or epoxy component and the second or acid component, but can also comprise a third component.

In a another embodiment, the formulation may include a third component additive consisting of a filler, expandable microspheres, ceramic spheres, carbon black, talc, clay, alumina, or glass which could comprise up to 80% of the first component. In this formulation, a viscous paste of inert materials could be formed by mixture with the acid component of the present invention, and such a product may have handling attributes for certain applications.

Still further, a number of other additives can be utilized in the present invention such as carbon black, solid rubber particles, hollow microspheres, and inert polymer particles, if desired in a particular application. For example, hollow glass microspheres may be added to reduce the density of the foam while maintaining good strength and stiffness. Commercially available hollow glass microspheres (sometimes also referred to as glass microballoons or microbubbles) include materials sold by Minnesota Mining & Manufacturing under the trademark SCOTCHLITE, with suitable grades including those available under the designations B38, C15, K20, and VS 5500. The glass microspheres preferably have diameters in the range of from about 5 to 200 micrometers. The crush strength of the hollow glass microspheres may be selected in accordance with the desired characteristics of the cured thermoset foam or chosen reinforced structural member containing such foam. Glass fiber is another alternative type of glass filler, since it helps increase the strength and stiffness of a standard reinforcement foam. The glass fiber may be chopped, milled, or in other suitable physical form. Other types of fillers may also optionally be present in the foamable composition. Any of the conventional organic or inorganic fillers known in the thermosettable resin art may be used including, for example, silica (including fumed or pyrogenic silica, which may also function as a thixotropic or rheological control agent), calcium carbonate (including coated and/or precipitated calcium carbonate, which may also act as a thixotropic or rheological control agent, especially when it is in the form of fine particles), fibers other than glass fibers (e.g., wollastinite fibers, carbon fibers, ceramic fibers, aramid fibers), alumina, clays, sand, metals (e.g. aluminum powder), microspheres other than glass microspheres such as ceramic microspheres, thermoplastic resin microspheres, thermoset resin microspheres, and carbon microspheres (all of which may be solid or hollow, expanded or expandable) and the like.

Other optional additives or components which could be utilized in alternative embodiments or formulations of the present invention include diluents (reactive or non-reactive) such as glycidyl ethers, glycidyl esters, acrylics, solvents and plasticizers, toughening or flexibilizing agents (e.g., aliphatic diepoxides, polyaminoamides, liquid polysulfide polymers, rubbers including liquid nitrile rubbers such as butadiene-acrylonitrile copolymers, which may be functionalized with carboxy groups, amine groups or the like), coupling agents/wetting agents/adhesion promoters (e.g., silanes), colorants (e.g., dyes and pigments such as carbon black), stabilizers (e.g., antioxidants, UV stabilizers) and the like. In this regard, the preferred formulation set forth below may utilize these additional components such as an optional coloring agent, reinforcements and fillers. The following table I sets forth the preferred and most preferred ranges in percent by weight for the components of the composition of the present invention in one preferred formulation:

| First Component (Epoxy) | (weight %) | Second Component (Acid) | (weight %) |
| --- | --- | --- | --- |
| DER 331 | 97.943 | Phosphoric Acid | 100% |
| Kevlar 1E543 | 0.748 | | |

-continued

| First Component (Epoxy) | (weight %) | Second Component (Acid) | (weight %) |
|---|---|---|---|
| Expancel 820Du | 0.935 | | |
| Pigment | 0.374 | | |
| | 100% | | |

In the method of the present invention, the resin component having the encapsulated solvent core and the acid component are combined, preferably in liquid form, for example the materials can be admixed either statically or dynamically with the mixture then being placed in the mold cavity, the mold cavity being an automotive body cavity or any cavity that one would like filled with foam. Alternatively, atomized streams of the separate materials can be impinged into a mold cavity. The encapsulated solvent core and the resin are preferably premixed and the acid added just prior to application (e.g., no more than about 60 minutes before or no more than about 10 minutes before). In those applications where the acid is also premixed with inert filler, the volumetric mix in this preferred premix step is preferably from about 1—1 to 20-1 (resin/filler-to-acid/inert material). Once mixed, the composition cures at room temperature (that is, without adding external heat) and the reaction of the acid with the epoxy provides an exotherm that softens the expandable microsphere shell to thereby expand and foam the resin. The present invention may be used in any of a number of different applications. In a preferred embodiment, it is applied into a hollow cavity. In a particularly preferred embodiment, it is applied to member or panel for assembly onto an automotive vehicle, an appliance or furniture.

Thus it is apparent that there has been provided in accordance with the invention a method and apparatus that fully satisfy the objects, aims and advantages set forth above. While the invention has been described in connection with specific embodiments thereof it is evident that many alternatives, modifications, and variations will be apparent to those skilled in the art in light of the foregoing description. Accordingly, it is intended to embrace all such alternatives, modifications and variations that fall within the spirit and broad scope of the appended claims.

What is claimed is:

1. A method for producing a foamed article, comprising the steps of:
    (a) providing a pre-mixed epoxy resin having an encapsulated solvent core, wherein the solvent core is provided in an expandable shell;
    (b) providing an acid component, the acid component being phosphoric acid;
    (c) combining the epoxy resin with the acid component to form an admixture, wherein:
        i) the admixture includes from about 50% to about 98% by weight of the resin; and
        ii) the admixture include about 5% to about 15% by weight of the acid; and
        iii) the admixture includes an aramid pulp;
    (d) applying the admixture to a member;
    wherein the acid component is combined with the resin to form the admixture no more than about 60 minutes before applying the admixture to the member and wherein the admixture foams upon forming the admixture to form the foamed article.

2. A method as in claim 1 wherein the admixture is substantially free of any components other than the epoxy resin and the acid component upon application of the admixture to the member.

3. A method as in claim 1 wherein the epoxy resin includes a chemical blowing agent.

4. A method as in claim 1 wherein foaming of the admixture is at least partially controlled by acid strength of acid component.

5. A method as in claim 1, further including the step of combining said phosphoric acid with an inert filler prior to forming the admixture.

6. A method as in claim 1, further comprising the step of combining a filler with the admixture.

7. A method as in claim 1 wherein the epoxy resin, the aramid pulp and the encapsulated solvent core are combined prior to adding said phosphoric acid.

8. A method for producing a foamed article, comprising the steps of:
    (a) providing a pre-mixed liquid epoxy resin having an encapsulated solvent core particle, wherein:
        i) the epoxy resin is a bisphenol A based epoxy resin;
        ii) the solvent core is provided as a hydrocarbon encapsulated in an expandable polymer shell; and
        iii) the epoxy resin including an aramid pulp;
    (b) providing a liquid acid component, the acid component being orthophosporic acid, the acid component also including the aramid pulp; and
    (c) combining the epoxy resin with the acid component to form an admixture, wherein:
        i) the admixture includes from about 50% to about 98% by weight of the resin; and
        ii) the admixture include about 5% to about 15% by weight of the acid; and
    (d) applying the admixture to a member of an automotive vehicle, the member being selected from a frame member and a body member, the admixture being applied to a metal portion of the member;
    wherein the acid component is combined with the resin to form the admixture no more than about 60 minutes before applying the admixture to the member of the vehicle and wherein admixture foams upon forming the admixture to form the foamed article; and
    wherein the epoxy resin, the aramid pulp of the epoxy resin and the encapsulated solvent core are combined with each other prior to combining the epoxy resin and the acid component and wherein the orthophosphoric acid and the aramid pulp of the acid component are combined with each other prior to combining the epoxy resin and the acid component.

9. A method as in claim 8 wherein the admixture is substantially free of any components other than the epoxy resin and the acid component upon application of the admixture to the member.

10. A method as in claim 8 wherein the epoxy resin includes a chemical blowing agent.

11. A method as in claim 8 wherein foaming of the admixture is at least partially controlled by acid strength of acid component.

12. A method as in claim 8, further including the step of combining said phosphoric acid with an inert filler prior to forming the admixture.

13. A method as in claim 8, further comprising the step of combining a filler with the admixture.

14. A method as in claim 1 wherein the member is selected from a pillar, a radiator support beam and a door.

* * * * *